United States Patent [19]

Azuma et al.

[11] Patent Number: 5,130,737
[45] Date of Patent: Jul. 14, 1992

[54] FLASH BRACKET PHOTOGRAPHING APPARATUS FOR A CAMERA

[75] Inventors: Yoshihiko Azuma; Takehiro Katoh; Naohiro Kageyama; Masayasu Hirano, all of Osaka, Japan

[73] Assignee: Minolta Camera Kabushiki Kaisha, Osaka, Japan

[21] Appl. No.: 655,227

[22] Filed: Feb. 12, 1991

Related U.S. Application Data

[63] Continuation of Ser. No. 543,666, Jun. 26, 1990, abandoned.

[30] Foreign Application Priority Data

Jun. 27, 1989 [JP] Japan ................................ 1-164358
Nov. 28, 1989 [JP] Japan ................................ 1-308068

[51] Int. Cl.$^5$ ................................................ G03B 15/05
[52] U.S. Cl. ........................................ 354/416; 354/423
[58] Field of Search .............. 354/412, 413, 416, 417, 354/418, 420, 422, 423, 127.1, 127.11, 127.12, 145.1, 458, 132, 141, 143, 148, 149.11

[56] References Cited

U.S. PATENT DOCUMENTS

| | | | |
|---|---|---|---|
| 3,616,733 | 11/1971 | Morse | 354/144 |
| 3,762,285 | 10/1973 | Tenkumo | 354/458 |
| 4,285,585 | 8/1981 | Numato et al. | 354/416 |
| 4,297,011 | 10/1981 | Adams, Jr. | 354/416 |
| 4,395,100 | 7/1983 | Kondo | 354/416 |
| 4,449,804 | 5/1984 | Watanabe et al. | 354/418 |
| 4,478,502 | 10/1984 | Nakai | 354/416 |
| 4,491,405 | 1/1985 | Tsuruta | 354/416 |
| 4,556,303 | 12/1985 | Martin | 354/141 |
| 4,592,639 | 6/1986 | Nakamura | 354/416 |
| 4,705,382 | 11/1987 | Mukai et al. | 354/416 X |
| 4,734,727 | 3/1988 | Takemae | 354/412 |
| 4,821,074 | 4/1989 | Nakai et al. | 354/402 |
| 4,862,205 | 8/1989 | Kawamura | 354/412 |
| 4,935,766 | 6/1990 | Kikukawa et al. | 354/412 |
| 4,985,725 | 1/1991 | Serikawa | 354/416 |

*Primary Examiner*—W. B. Perkey
*Attorney, Agent, or Firm*—Willian Brinks Olds Hofer Gilson & Lione

[57] ABSTRACT

A bracket photographing apparatus for a camera system using a flash light unit. In a flash bracket photographing, a series of photographs (frames) are taken with the film exposure differing between the frames, where the exposure difference is caused by a change in the light emitting amount of the flash light unit. The invention also considers the case where a flash light unit is not attached to the camera body, or is not controllable by the system (e.g., the attached flash light unit is not a controllable type).

20 Claims, 10 Drawing Sheets

FLASH BRACKET PHOTOGRAPHING APPARATUS FOR A CAMERA

This application is a continuation of application Ser. No. 07/543,666, filed Jun. 26, 1990 now abandoned.

FIELD OF THE INVENTION

The present invention relates to a camera system, especially to that having a bracket photographing function in which a preset number of film frames are sequentially photographed with the film exposures differing by a preset amount.

BACKGROUND OF THE INVENTION

When a picture is taken by a camera, the film exposure should be determined beforehand. But it is sometimes difficult to determine the most desirable exposure value for a given picture scene. It is useful in this case to determine the most desirable exposure factors such as shutter speed and diaphragm aperture value among a plurality of pictures taken by the bracket photographing function.

Normally, no flash light is used in bracket photographing. But if flash light is used in bracket photographing, the aperture value, rather than the shutter speed, should be changed to change the exposure value because the duration of a flash light emission should be within synchronizable shutter speed when a focal plane shutter is used. One of the problems in this case is that the depth of field changes between frames which may be against the photographer's intention. Another problem arises when a rather sophisticated camera system is used in which a camera computer controls the light emitting amount of the flash light unit attached to the camera. In this camera system, the camera computer stops flash light emission when the amount of light received through the photographic lens reaches a preset value. Therefore, when the aperture value of the photographic lens is changed to reduce the incoming light amount, the camera computer automatically compensates for the reduction by elongating the duration of the flashing to keep the exposure value of the main object (on which the flash light is most effectively given) constant. This means that a flash bracket photographing by changing the aperture value is nonsense in such a camera system.

SUMMARY OF THE INVENTION

One of the object of the present invention is, therefore, to provide an elaborate camera system enabling a bracket photographing when a flash light is used.

Another object of the present invention is to consider the case in the flash bracket photographing where the attached flash light unit is not a controllable type, i.e., the flash light emitting amount cannot be controlled.

The first object is achieved by a flash bracket photographing apparatus of the present invention which comprises: bracket photographing means for sequentially taking a plurality of photographs; flash light emitting means; light amount controlling means for controlling a light amount emitted from the flash light emitting means; and flash bracket means for controlling the light amount controlling means so that the light amount emitted from the flash light emitting means changes every time the bracket photographing means takes a photograph.

For the second object, the present invention provides a flash bracket photographing apparatus which comprises: bracket photographing means for sequentially taking a plurality of photographs; flash light emitting means attachable to the camera; exposure control means for controlling an aperture value and a shutter speed; detecting means for generating an attachment signal when the flash light emitting means is attached to the camera, and a non-attachment signal when the flash light emitting means is not attached; flash bracket means for controlling the flash light emitting means or the exposure control means every time the bracket photographing means takes a photograph; and supervising means for controlling the flash bracket means according to the signal from the detecting means.

Many other features of the present invention for addressing the above and other relating objects will be described in the detailed description of the embodiment that follows.

BRIEF DESCRIPTION OF THE ATTACHED DRAWINGS

DETAILED DESCRIPTION OF THE PREFERRED EMBODIMENTS

Figure 1:
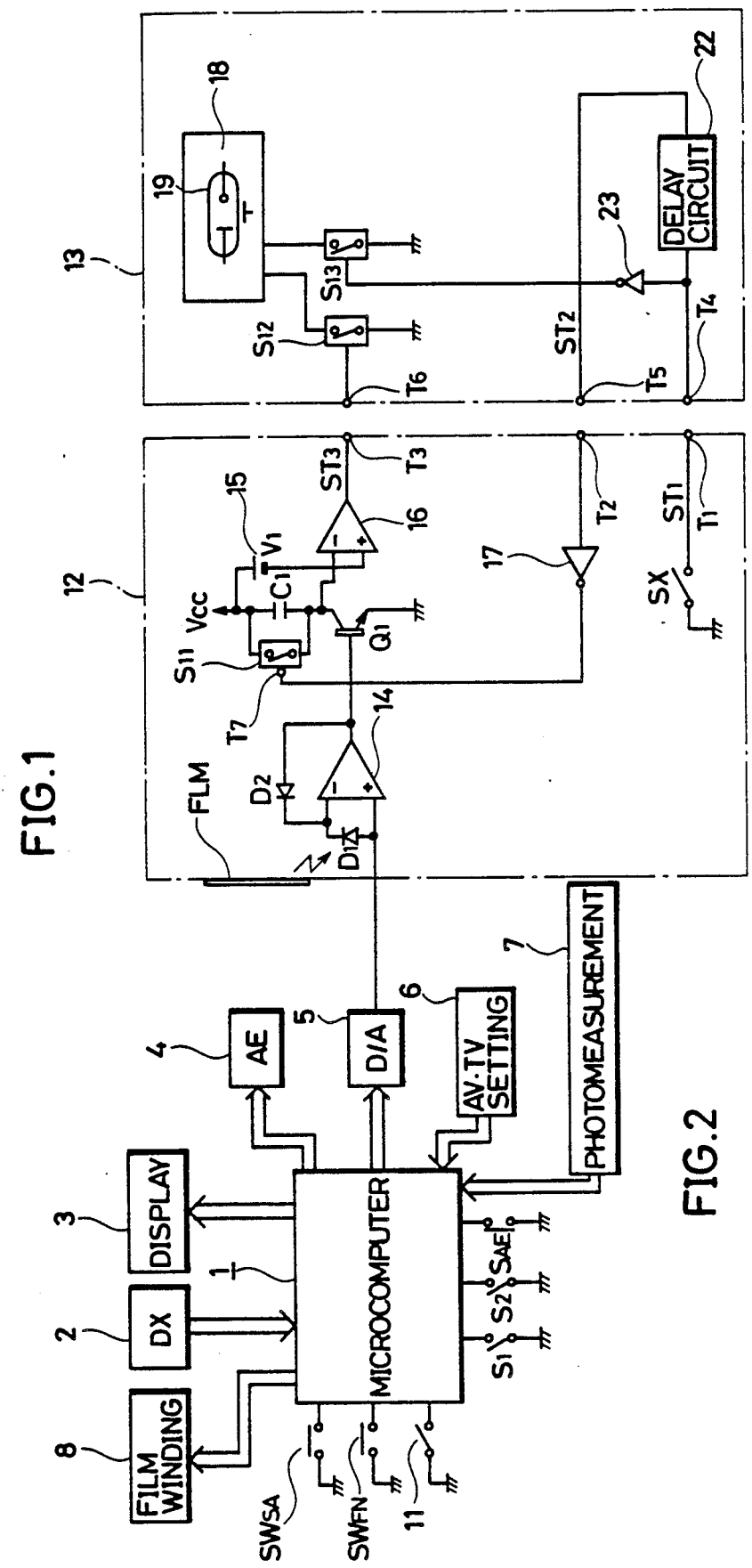
FIG. 1 is a block diagram of the electric system of the camera system of the first embodiment.

Hereinafter, embodiments according to the present invention will be explained with reference to the accompanying drawings. FIG. 1 is a circuit block diagram of the control system pertinent to the present invention of a camera system as a first embodiment. The camera system includes a camera body and a flash unit, and the system has a flash bracket photographing function.

Here operations for a flash bracket photographing function is briefly explained first. When this function is selected or to be operated by operating a proper switch, the photographer inputs the number of frames (preset number) to be exposed in a bracket photographing operation and a unit shift amount using respective switches (the switches will be described later). Then, when the photographer presses the shutter release button (shutter release switch) of the camera, the camera system automatically takes the preset number of pictures with the light emitting amount of the flash unit attached to the camera body varying by the preset unit shift amount with every shutter release operation.

Referring to FIG. 1, the camera body is provided with a microcomputer 1 which performs various control operations for the camera system, including the flash bracket photographing operation. To the microcomputer 1 are connected: a DX circuit 2, a displaying circuit 3, an AE circuit 4, a D/A converter 5, an AV·TV setting circuit 6, a photomeasurement circuit 7, a film winding-up circuit 8 and so on. Such peripheral devices send and/or receive signals to/from the microcomputer 1. The DX circuit 2 detects the ISO film speed SV from the film cartridge loaded in the camera body and sends the film speed data to the microcomputer 1. The displaying circuit 3 receives display data from the microcomputer 1 to construct a display in an external display panel provided on the surface of the camera body and in an internal display panel provided in the viewfinder. In the case of flash bracket photographing according to the present embodiment, an adjustment shift $\Delta SV_1$ to flash light amount control is displayed both in the external display panel and internal display panel, and the preset number of frames is displayed only in the external display panel in this embodiment.

The AE circuit 4 performs an exposure control based on the aperture value AV and shutter speed TV calculated or set by the microcomputer 1. The D/A converter 5 converts a flash light amount control data from the microcomputer 1 into an analog data to supply the data to a flash light photometering circuit 12. The flash light amount control data is determined by considering the film speed SV (which is detected by the DX circuit 2) and an adjustment $\Delta SV_1$.

The AV·TV setting circuit 6 sets the aperture value AV and/or the shutter speed TV when the exposure control operation is performed in A, S or M mode, i.e., not in P mode. Here, P mode is a programmed automatic exposure control mode, A mode is an aperture priority automatic exposure control mode, S mode is a shutter-speed priority automatic exposure control mode and M mode is a manual exposure control mode. The photomeasurement circuit 7 receives light coming from an object to be photographed and measures the amount of amibient light. The film winding-up circuit 8 winds the film to advance one frame each time after an exposure operation is performed.

Various other operation switches are connected to the microcomputer 1: an AE switch $S_{AE}$ is used to select a mode from the P, A, S and M exposure control modes. In response to each depression of the AE switch $S_{AE}$, the exposure control mode is cyclically changed, as P→A→S→M→P. A photomeasurement starting switch $S_1$ is turned on when a shutter release button is touched or pressed halfway. When the photomeasurement starting switch $S_1$ is turned on, focus detection, photomeasurement, display and other processes are started. When the shutter release button is pressed all the way down, a shutter release switch $S_2$ is turned on to start the shutter release operation. A shift amount setting switch $SW_{SA}$ is used for selecting either 0.5 EV or 1.0 EV as the unit shift amount of the adjustment (to the SV value). A number-of-frames setting switch $SW_{FN}$ is used for setting the number of frames for a bracket photographing. The frame number can be selected among 3, 5 and 7 frames. A bracket setting switch 11 is turned on when the bracket photographing is to be performed, and turned off in the case of normal photographing.

The flash light photometering circuit 12 controls an amount of flash light by stopping the flashlight emission from a flash unit 13 which is equivalent to the SV value with the adjustment $\Delta SV1$ added based on the flash light amount control data. The flash light photometering circuit 12, which is provided in the camera body, includes: an operational amplifier 14, a light receiving element $D_1$, a diode $D_2$, a transistor $Q_1$, a capacitor $C_1$, a switch $S_{11}$ and a comparator 16. The operational amplifier 14 receives output of the D/A converter 5 through its (+) input terminal. The light receiving element $D_1$ constituted by a photodiode is connected between the (+) input terminal and the (−) input terminal of the operational amplifier 14. The diode $D_2$ connected between the output terminal and the (−) input terminal of the operational amplifier 14 logarithmically compresses input data of the operational amplifier 14. The logarithmically compressed output voltage is coupled to a transistor $Q_1$ which supplies a logarithmically expanded electric current. The capacitor $C_1$, which is connected between the collector of the transistor $Q_1$ and a power source $V_{CC}$, integrates logarithmically expanded electric current. This integrating operation of the capacitor $C_1$ is controlled by the switch $S_{11}$. The comparator 16 receives, through its (−) input terminal, the output voltage of the collector of the transistor $Q_1$, and, through its (+) input terminal, a reference voltage $V_1$ of constant voltage source 15.

The flash light photometering circuit 12 further includes a synchronizing contact (X contact) SX, a first terminal $T_1$, a second terminal $T_2$, a third terminal $T_3$, a control terminal $T_7$ of the switch $S_{11}$ and an inverter 17. When the preceding curtain of the focal-plane shutter completes the run and the shutter is fully open, the synchronizing contact SX is turned on to produce a light emission starting signal $ST_1$. The signal $ST_1$ is transmitted to the flash unit 13 through the first terminal $T_1$. The inverter 17 transmits a signal $ST_2$, which is sent through the second terminal $T_2$ from the flash unit 13, to the control terminal $T_7$ of the switch $S_{11}$ after inversion. A light emission stopping signal $ST_3$ generated by the comparator 16 is transmitted to the flash unit 13 through the third terminal $T_3$.

The flash unit 13 includes: a light emitting part 18 using a xenon tube 19; a light emission stopping switch $S_{12}$ which is turned on by the light emission stopping signal $ST_3$; a light emission starting switch $S_{13}$; a delay circuit 22 which produces a low-level signal after elapse of a predetermined delay time in response to the light emission starting signal $ST_1$; an inverter 23 which inverts the low-level light emission starting signal $ST_1$ to the high level to be supplied to the light emission starting switch $S_{13}$; and fourth, fifth, and sixth terminals $T_4$, $T_5$ (where the output terminal of the delay circuit 22 is connected) and $T_6$ corresponding to the first, second and third terminals $T_1$, $T_2$ and $T_3$, respectively.

When the shutter release button is pressed all the way down to release the shutter, the synchronizing contact SX is turned on to produce the light emission starting signal $ST_1$. After elapse of the predetermined time, the low-level signal $ST_2$ is generated from the delay circuit 22. The low-level signal $ST_2$ is inverted to the high level by the inverter 17 and applied to the control terminal $T_7$ of the switch $S_{11}$, to turn off the switch $S_{11}$.

In the flash unit 13, the light emission starting signal $ST_1$ is inverted to the high level by the inverter 23 and transmitted to the light emission starting switch $S_{13}$, whereby the light emission starting switch $S_{13}$ is turned on to allow the light emitting part 18 to start flashlight emission. While the flashlight is emitted toward the object, the light reflected by the object enters camera through the photographic lens. A part of the incident light is reflected by the surface of the film FLM and enters the light receiving element $D_1$, which produces an output current corresponding to the intensity of light at the film. The output current is changed to a logarithmically compressed voltage through the operational amplifier 14 and the diode $D_2$, to be applied to the base of the transistor $Q_1$. The output current produced on the collector side of the transistor $Q_1$ charges the capacitor $C_1$, whose charging voltage corresponds to the exposure level. When the charging voltage reaches a reference voltage $V_1$, the output of the comparator 16 changes to the high level. The high-level output signal, which serves as the light emission stopping signal $ST_3$, is transmitted to the light emission stopping switch $S_{12}$ to stop the xenon tube 19 emitting the flashlight. As described above, when a desirable exposure level is attained, the flashlight emission of the flash unit 13 is stopped to complete the flash light adjusting operation.

Figure 2:
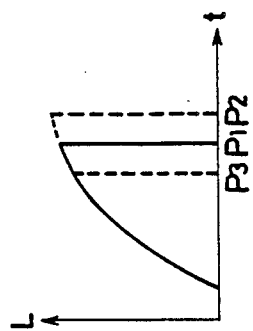
FIG. 2 is a graph showing the relationship between the flash light duration t and the emitted light amount L.

When the flash light amount control data from the microcomputer 1 corresponds to just the film speed SV (i.e., the adjustment $\Delta SV_1 = 0$), the flashlight emission stopping point is represented as the point $P_1$ in FIG. 2 which is assumed as the proper exposure. If the adjustment shift amount $-\Delta SV$ is added to (i.e., $\Delta SV$ is subtracted from) the film speed SV, the flash light amount control data is a smaller value. In this case, the potential of the output point of the operational amplifier 14 is reduced to decrease the collector current of the transistor $Q_1$, even if the same light amount is received by the light receiving element $D_1$. Therefore, it takes a longer time to charge the capacitor $C_1$, and the inversion (low-level to high-level) of the comparator 16 is performed later. Accordingly, in this case, the flashlight emission stopping point of the flash unit 13 is represented as the point $P_2$ in FIG. 2. This means that the object is overexposed as compared with the flashlight amount previously assumed as proper exposure. In FIG. 2, the flashlight emission amount is taken as the vertical axis and time (t) as the horizontal axis.

When the flash light amount control data from the microcomputer 1 is made by adding an adjustment shift amount $+\Delta SV$ to the film speed SV, the potential of the base of the transistor $Q_1$ is made higher, even if the same light amount is received by the light receiving element $D_1$. In response thereto, the collector current is increased to shorten the charging time of the capacitor $C_1$, and the inversion of the comparator 16 is performed more rapidly. As a result, the flashlight emission of the flash unit 13 is stopped at the point $P_3$ in FIG. 2. This means that the object is under-exposed as compared with the assumed flashlight amount for the proper exposure.

According to the present embodiment, as described later, in the case of flash bracket photographing, the adjustment is sequentially varied as $0 \rightarrow -\Delta SV$ (over-exposure)$\rightarrow +\Delta SV$ (under-exposure)$\rightarrow -\Delta SV \times 2 \rightarrow +\Delta SV \times 2 \rightarrow \ldots$, each time the shutter is released, and the adjustment is added to the film speed SV at each frame for making the graded flash light amount control data. The microcomputer 1 transfers the flash light amount control data, in which the adjustment is included, to the flash unit 13 to perform the light adjustment control operation corresponding to the data. Here, $\Delta SV$ is the unit shift amount previously set by the shift amount setting switch $SW_{SA}$, and either 0.5 EV or 1.0 EV can be set as the unit shift amount $\Delta SV$ in the present embodiment.

Figure 3:
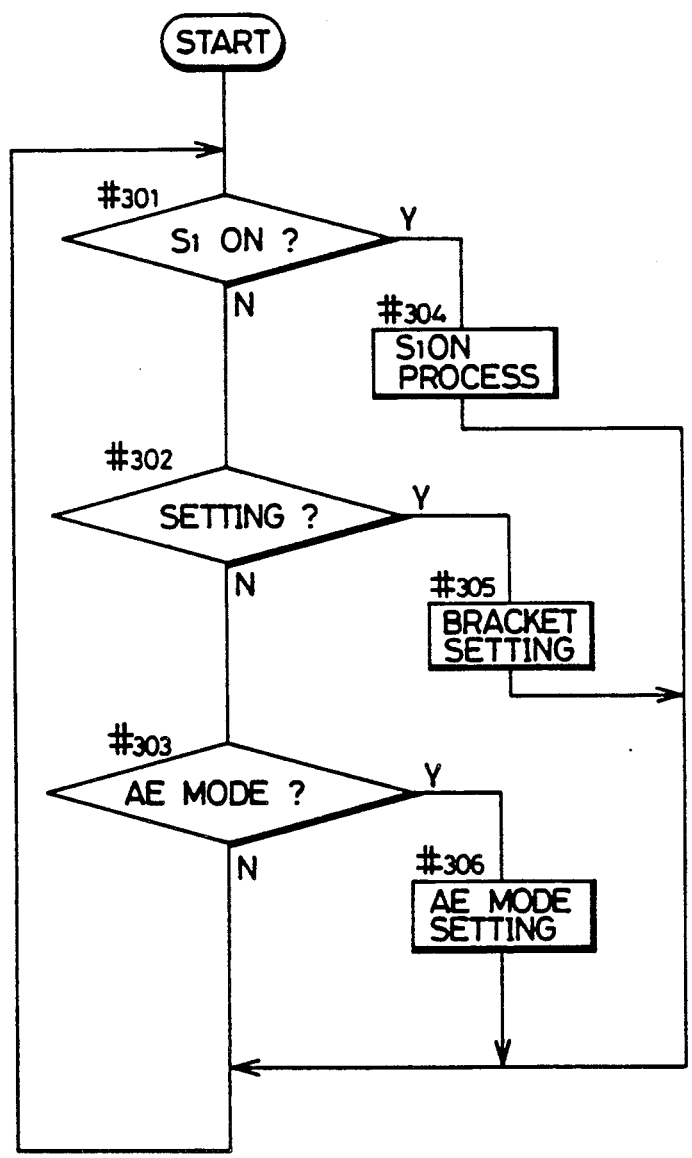
FIGS. 3, 4, 5 and 6A–6C are flowcharts of operations of a microcomputer of the camera system of the first embodiment.

The operation of the microcomputer 1 for performing the bracket photographing of the present embodiment is explained here with reference to the flowcharts of FIGS. 3 to 6C. FIG. 3 shows the basic control operation of the microcomputer 1 in the case of flash bracket photographing. When this routine is called, it is first checked, at step #301, whether or not the photomeasurement starting switch $S_1$ is on. When the switch $S_1$ is on, the process proceeds to step #304 where a $S_1$-ON subroutine is executed. Detail description thereof will be provided later with reference to FIGS. 6A, 6B and 6C. When it is determined that the photomeasurement starting switch $S_1$ is off at the step #301 judgment, the process proceeds to step #302, where it is further judged whether or not either of the shift amount setting switch $SW_{SA}$ and the number-of-frames setting switch $SW_{FN}$ is turned on. If either the shift amount setting switch $SW_{SA}$ or the number-of-frames setting switch $SW_{FN}$ is turned on, the process proceeds to step #305, where a subroutine for bracket setting is executed according to the flowchart of FIG. 4. On the other hand, if neither the shift amount setting switch $SW_{SA}$ nor the number-of-frames setting switch $SW_{FN}$ is on, the process proceeds to step #303, where it is further judged whether or not the AE mode switch $S_{AE}$ is on. When the switch $S_{AE}$ is on, the process proceeds to step #306, where a subroutine for AE mode setting is executed to set the exposure control mode to P, A, S, or M mode at step #501 of the flowchart of FIG. 5. Thereafter the process returns. When the step #303 judgement results in a determination that the AE mode switch $S_{AE}$ is off, the process returns to the step #301 and repeats the routine of the step #301 and the subsequent steps. The order of the steps #301, #302 and #303 is not restrictive and may be changed in any way.

Figure 4:
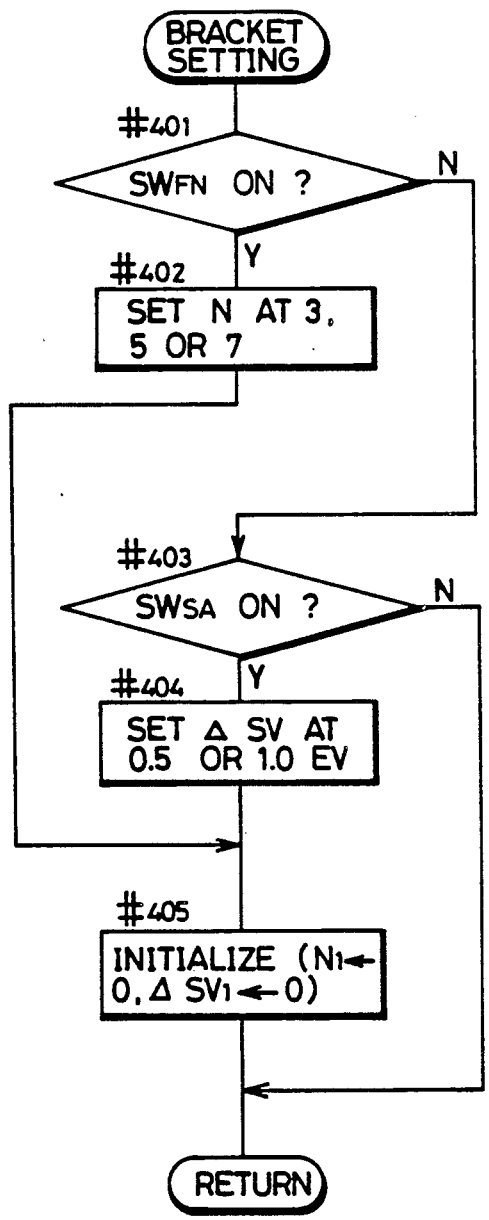

The bracket setting routine at the step #305 will be explained with reference to FIG. 4. In the bracket setting routine, the unit shift amount (which is used for composing the adjustment element of the flash light amount control data sent from the microcomputer 1) is set to either 0.5 EV or 1.0 EV. The routine also sets the number of frames of film to be exposed in a bracket photographing operation. In the flowchart of FIG. 4, at step #401, it is first judged whether or not the number-of-frames setting switch $SW_{FN}$ is on. When the switch $SW_{FN}$ is on, the process proceeds to step #402, where the number N of frames to be exposed in a bracket photographing operation is set to 3, 5 or 7. At this time, in response to each successive depression of the switch $SW_{FN}$, the number N is cyclically selected as $3 \rightarrow 5 \rightarrow 7 \rightarrow 3$. Then the process proceeds to step #405, where the number of exposed frames is initialized to zero, and the adjustment to SV is also initialized to zero ($N_1 \rightarrow 0$, $\Delta SV_1 \rightarrow 0$). Then the process returns.

When the number-of-frames setting switch $SW_{FN}$ is off at the step #401, the process proceeds to step #403, where it is further judged whether or not the shift amount setting switch $SW_{SA}$ is on. If the shift amount setting switch $SW_{SA}$ is on, the unit shift amount $\Delta SV$ is set to 0.5 or 1.0 (Ev) at step #404, and then the process proceeds to step #405. On the other hand, when the shift amount setting switch $SW_{SA}$ is off at the step #403, the process returns.

As described above, when the number-of-frames setting switch $SW_{FN}$ is on, the process proceeds through steps #401, #402, #405, and then returns. When the shift amount setting switch $SW_{SA}$ is on (in this case, the number-of-frames setting switch $SW_{FN}$ is normally off), the process proceeds through steps #401, #403, #404, #405, and then returns.

Figure 6A:
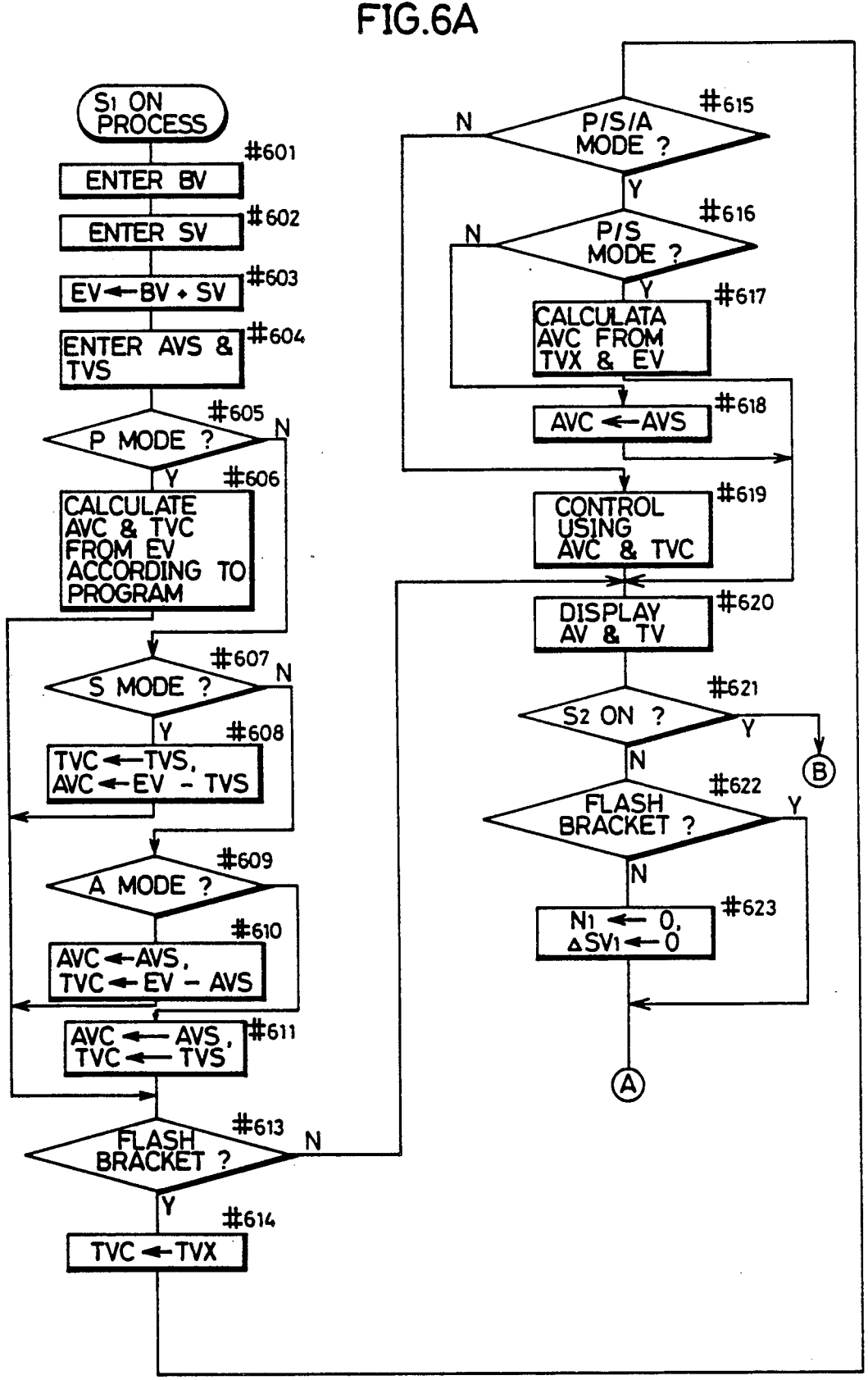

The $S_1$-ON routine is now explained with reference to FIGS. 6A, 6B and 6C. When this routine is called, the brightness BV of the object is first entered from the photomeasurement circuit 7 at step #601, and then the film speed SV is entered from the DX circuit 2 at step #602. Then the exposure value EV is calculated at step #603 based on the entered luminance BV and the film speed SV by:

$$EV = BV + SV.$$

Subsequently, after entering a preset aperture value AVS and a preset shutter speed TVS from the AV·TV setting circuit 6 at step #604, the process proceeds to step #605, where it is judged whether or not the current exposure control mode is P mode. If it is P mode, a control aperture value AVC and a control shutter speed TVC are calculated from the exposure value EV according to a predetermined program diagram (step #606). Here the program diagram can be an appropriate one of widely used diagrams in program controlled cameras. After step #606, the process proceeds to step #613.

If it is not P mode at step #605, a judgment is further made, at step #607, as to whether or not it is currently S mode. If it is not S mode, the process proceeds to step #609, where it is judged whether or not it is A mode. If it is not A mode at step #609, it is determined that the exposure control mode is the remaining mode, i.e., M mode. In this case, the process proceeds to step #611, where the preset aperture value AVS and the preset shutter speed TVS are respectively used as the control aperture value AVC and control shutter speed TVC for the exposure control. Then the process proceeds to step #613.

If it is judged S mode at step #607, the preset shutter speed TVS is set to the control shutter speed TVC (TVC←TVS), and the control aperture value AVC is calculated based on the exposure value EV and the preset shutter speed TVS at step #608 by:

$$AVC = EV - TVS.$$

Then the process proceeds to step #613.

If it is A mode at step #609, the preset aperture value AVS is set to the control aperture value AVC (AVC←AVS), and the control shutter speed TVC is calculated based on the exposure value EV and the preset aperture value AVS at step #610 by:

$$TVC = EV - AVS.$$

Then the process proceeds to step #613.

At the step #613, it is judged whether or not the flash bracket photographing mode has been set. When the flash bracket photographing mode is previously set by turning on the bracket setting switch 11, the process proceeds to step #614 where the control shutter speed TVC is set to the maximum synchronizing speed TVX (TVC←TVX) to synchronize with the flash unit. At the following step #615, it is judged whether or not the current exposure control mode is any of P, S, and A modes. If it is one of P, S, and A modes, a judgment is further made at the next step #616, as to whether or not the mode is P or S. If it is judged either P or S mode, the control aperture value AVC is recalculated at step #617 based on the exposure value EV and the maximum synchronizing shutter speed TVX, and the control shutter speed TVC is remained set to the maximum synchronizing shutter speed TVX. If the exposure control mode is neither P nor S mode at step #616 (which means it is A mode), the control aperture value AVC is set to the preset aperture value AVS, and the control shutter speed TVC is remained set to the maximum synchronizing shutter speed TVX (step #618). As a result of the step #615 judgment, if it is determined that current mode is M, the exposure control is performed using the control aperture value AVC and the control shutter speed TVC as is intended by the photographer (step #619). After setting the aperture value AV and the shutter speed TV in each exposure control mode as described above, both set values are displayed by the displaying circuit 3 at step #620.

When it is not the flash bracket photographing mode at step #613, the process directly proceeds to step #620 where the aperture value AV and the shutter speed TV having been set at the step #606, #608, #610 or #611 are displayed corresponding to the set exposure control mode.

After displaying both values at the step #620, the process proceeds to step #621 where it is judged whether or not the shutter release switch $S_2$ is on. When the release switch $S_2$ is off, it is further judged at step #622 whether or not it is the flash bracket photographing mode. When it is not the flash bracket photographing mode, the number of exposed frames $N_1$ in a flash bracket photographing and the adjustment $\Delta SV_1$ are both initialized to zero ($N_1 \leftarrow 0$, $\Delta SV_1 \leftarrow 0$), and thereafter the process returns. Though the same initialization ($N_1 \leftarrow 0$, $\Delta SV_1 \leftarrow 0$) is performed also at the step #405 in FIG. 4, the initialization at step #405 is performed only when either the number-of-frames setting switch $SW_{FN}$ or the shift amount setting switch $SW_{SA}$ is turned on. On the other hand, the step #623 initialization is performed in the routine which is executed when the photomeasurement starting switch $S_1$ is turned on, irrespective of the state of the number-of-frames setting switch $SW_{FN}$ or the shift amount setting switch $SW_{SA}$. The reason why such initialization is performed at the step #623 is as follows: when the bracket photographing operation is ceased by turning off the bracket setting switch 11 during the bracket photographing operation, it is desirable to reset (initialize) the number of exposed frames $N_1$ and the adjustment $\Delta SV_1$ to zero.

Figure 6B:
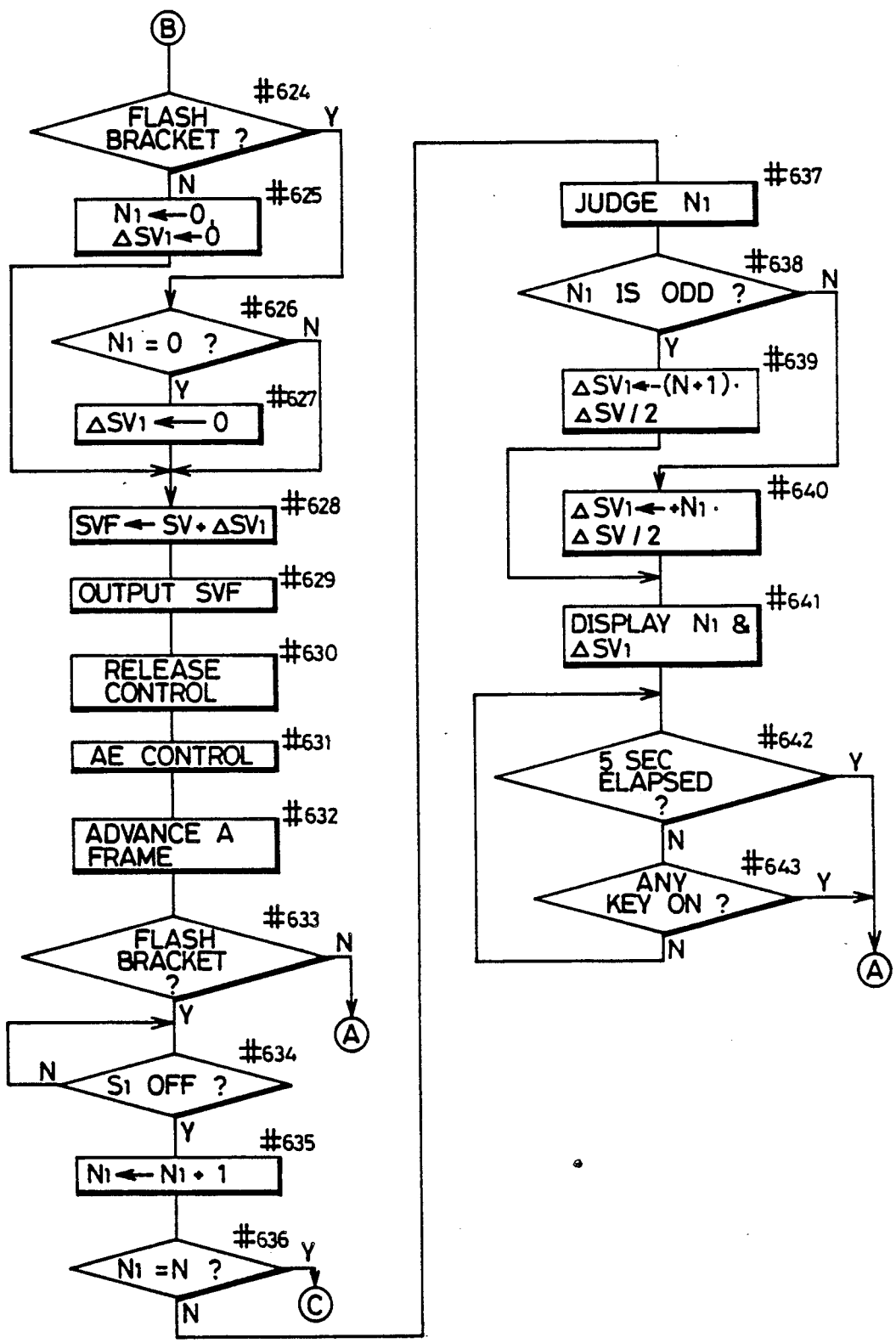
Figure 6C:
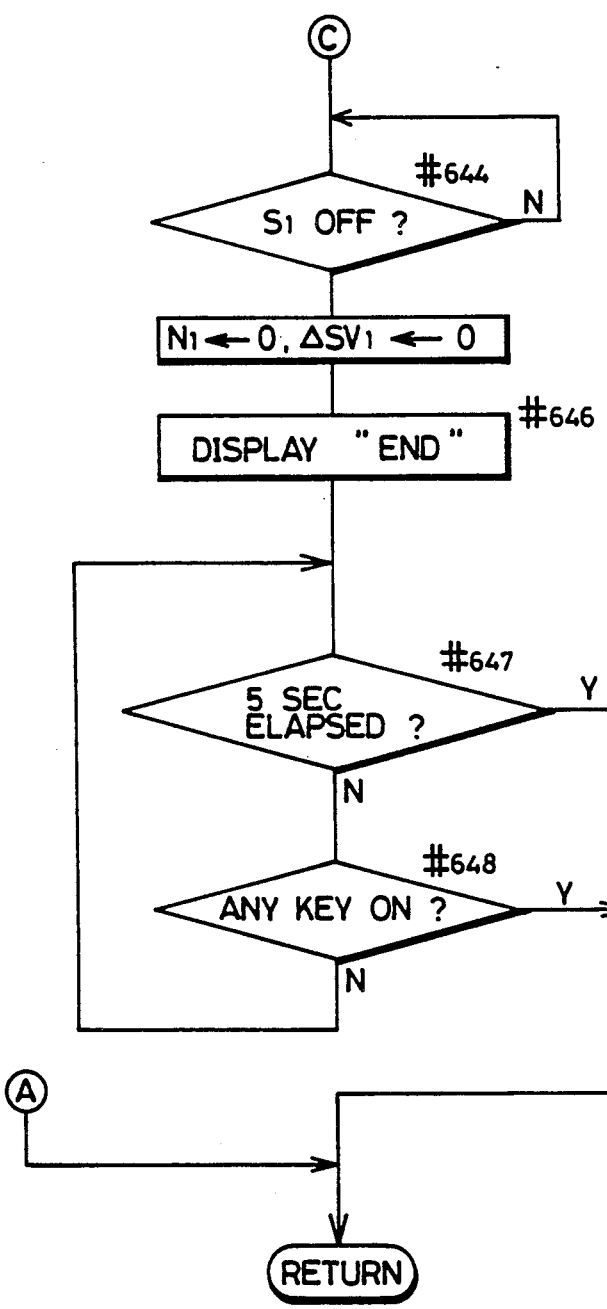

When the step #621 judgment results in a determination that the release switch $S_2$ is on, the process proceeds to step #624 of FIG. 6B, where it is judged whether or not it is the flash bracket photographing mode. If it is not the flash bracket photographing mode, the number of exposed frames $N_1$ and the adjustment $\Delta SV_1$ are initialized to zero at step #625 for the similar reason to the case of the previous initialization step #623. The process thereafter proceeds to step #628.

When it is judged to be the flash bracket photographing mode at the step #624, it is judged at step #626 whether or not the number of exposed frames $N_1$ is equal to zero. If $N_1 \neq 0$, the process proceeds to step #628. If $N_1 = 0$, the process proceeds to the next step #627, where the adjustment $\Delta SV_1$ is also set to zero ($\Delta SV_1 \leftarrow 0$) corresponding to the initialization for the number of exposed frames $N_1$, followed by the step #628.

At the step #628, the microcomputer 1 calculates a flashlight amount (which corresponds to the flash light amount control data) SVF based on the film speed SV and the adjustment $\Delta SV_1$ by:

$$SVF = SV + \Delta SV_1.$$

Subsequently, the calculated data SVF is sent to the D/A converter 5 at step #629.

Then the shutter release operation is performed at step #630. The exposure control is performed at the subsequent step #631 based on the control aperture value AVC and the control shutter speed TVC. On completing the exposure control, the film winding-up circuit 8 is driven at step #632 to wind-up the film to advance one frame.

At the following step #633, it is judged whether or not it is the flash bracket photographing mode. If it is not flash bracket photographing mode, the process returns. If it is the flash bracket photographing mode, the process waits at step #634 until the photomeasurement starting switch $S_1$ is turned off. When the switch $S_1$ is turned off, the process proceeds to step #635, where the number of exposed frames $N_1$ is increased by 1. Then a judgment is made at step #636 as to whether or not the number of exposed frames $N_1$ is equal to the preset number N. If $N_1 \neq N$, i.e., the predetermined flash bracket photographing operation has not been completed, the number of exposed frames $N_1$ is judged at step #637 in order to determine the next adjustment value $\Delta SV_1$.

In the flash bracket photographing of the present embodiment, the adjustment value $\Delta SV_1$ is varied between alternate signs, i.e., $0 \rightarrow -\Delta SV$ (overexposure)$\rightarrow +\Delta SV$ (underexposure)$\rightarrow -\Delta SV \times 2 \rightarrow +\Delta SV \times 2 \rightarrow \ldots$. For this reason, it is necessary to judge the number of exposed frames $N_1$ at step #637. When the number $N_1$ is judged to be an odd number at step #638, the process proceeds to step #639 where the adjustment $\Delta SV_1$ is calculated by:

$$\Delta SV_1 = -(N_1+1) \times SV/2.$$

Thereafter the process proceeds to step #641. If the number of exposed frames $N_1$ is an even number at step #638, the process proceeds to step #640, where the adjustment $\Delta SV_1$ is calculated by:

$$\Delta SV_1 = N_1 \times \Delta SV/2.$$

Thereafter the process proceeds to the step #641. At the step #641, the next number $N_1$ of frames to be exposed and the adjustment $\Delta SV_1$ are displayed by the displaying circuit 3. Then the process waits for 5 seconds at step #642 for the display recognition, and thereafter returns. However, if any key is turned on at step #643 during the wait state, the process returns before elapse of the 5 seconds to give priority to execution of the function due to ON of the key.

When the number of exposed frames $N_1$ is equal to the preset number N at the step #636, i.e., the predetermined bracket photographing operation has been completed, the process waits at step #644 (FIG. 6C) until the photomeasurement starting switch $S_1$ is turned off. When the switch $S_1$ is turned off, the number of exposed frames $N_1$ and the adjustment $\Delta SV_1$ are both initialized to zero at step #645. Then, the completion of the bracket photographing operation is displayed in the display panels by the displaying circuit 3 at the next step #646. The process waits for 5 seconds at step #647 for the display recognition, and thereafter returns. When any key is turned on at step #648 during the 5 seconds, the process immediately returns to give priority to execution of the function due to ON of the key.

In the present embodiment as described above, in the case of the flash bracket photographing mode, the flash light amount of the photometering circuit 12 for controlling the flash unit 13 is varied based on the adjustment value from the microcomputer 1. Thereby, each time a frame is exposed in the bracket photographing, the flashlight emission amount is changed without changing the aperture value.

Figure 7:
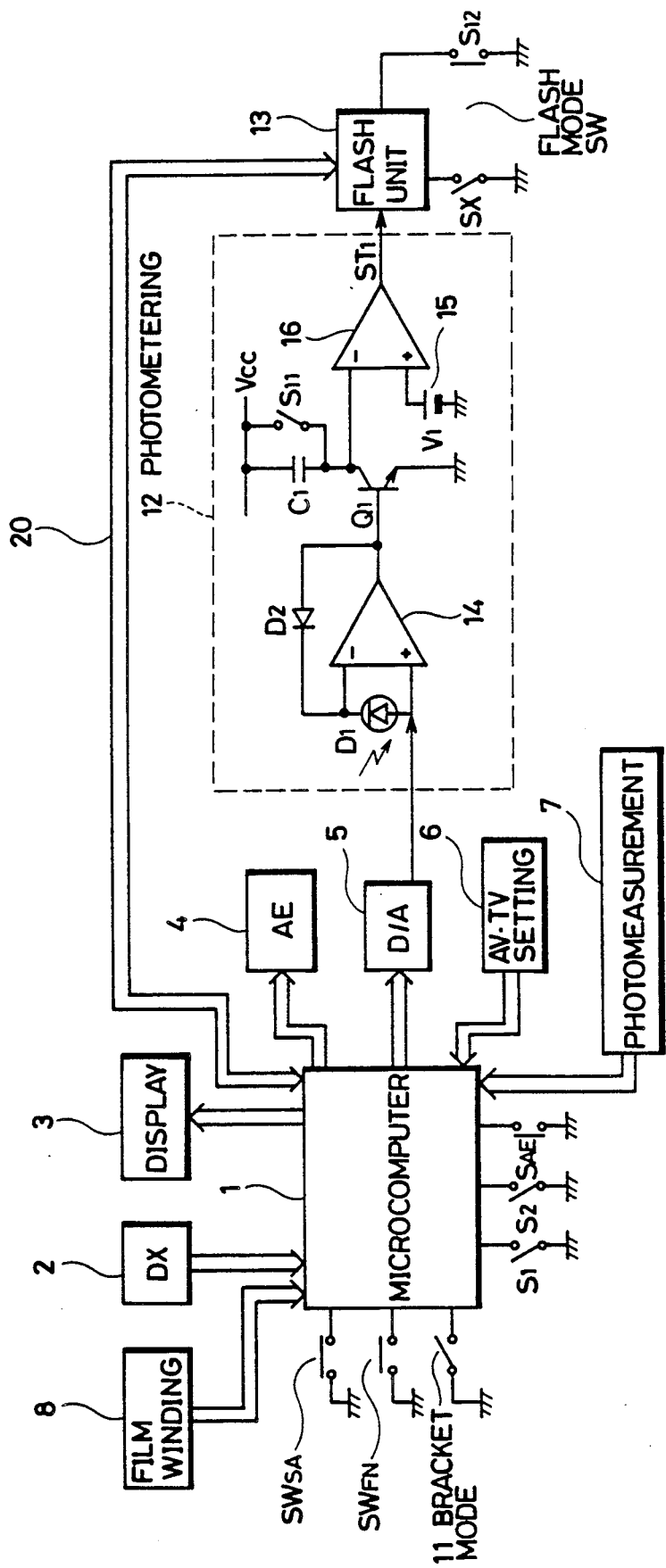
FIG. 7 is a block diagram of the electric system of the camera system of the second embodiment.

In the above embodiment, it is necessary to use such a flash unit 13 that can be controlled by the camera body. Here the second embodiment of the present invention is described in which a flash unit that cannot be controlled by the camera body can be used, as well as the previous type that can be controlled by the camera body, in flash bracket photographing. The second embodiment is described with reference to the circuit block diagram of FIG. 7 and the flowcharts of FIGS. 8A, 8B and 8C. In FIG. 7, the same element as in FIG. 1 is numbered the same.

Among various flash units, one type is a controllable flash unit in which the flashlight emission amount can be controlled by the camera body, and the other type is a non-controllable flash unit in which the flashlight emission amount can not be controlled by the camera body. When a controllable flash unit 13 is attached on the camera body and is set to an available state by operating a flash mode switch $S_{12}$, the microcomputer 1 recognizes the flash ON mode. At this time, the microcomputer 1 controls the light emission amount of the flash unit 13 in the following manner.

First, the flash light amount control data, which is made by adding the adjustment value $\Delta SV_1$ to the film speed SV, is supplied from the microcomputer 1 to the photometering circuit 12 through the D/A converter 5. Thereby, a stop signal $ST_1$ is generated, and the signal $ST_1$ is sent to the flash unit 13 to control the duration of the light emission. Further, the adjustment $\Delta SV_1$ is changed each time an exposure operation is performed.

When a controllable flash unit 13 is attached on the camera body but the flash mode switch $S_{12}$ is OFF, it is determined by the microcomputer 1 that the set mode is the flash OFF mode. When an uncontrollable flash unit is attached, it is also determined that the flash OFF mode is set, irrespective of an operation of the flash mode switch $S_{12}$. When no flash unit is attached on the camera body, of course, it is determined that the flash OFF mode is set.

The judgment whether the set mode is the flash ON mode or the flash OFF mode is made by performing a predetermined communication process through a signal line 20 between the microcomputer 1 and the flash unit 13. If an uncontrollable flash unit is attached, or no flash unit is attached on the camera body, there is no response from the other end of the signal line 20 when a call signal is sent from the microcomputer 1, whereby it is determined as the flash OFF mode. If a controllable flash unit 13 is attached, the microcomputer 1 determines the set mode on the basis of ON/OFF data coming from the flash unit 13 depending on the state of the flash mode switch $S_{12}$. When the X switch $S_X$ connected to the flash unit 13 is turned on, an emission starting signal is sent to the flash unit 13.

In the present embodiment, a control operation is performed for the flash bracket photographing in the case of the flash ON mode. In the case of the flash OFF mode, the control operation for the flash bracket photographing is performed only when the exposure control mode is the M mode by changing the aperture value at every shutter release operation. If the exposure control mode is other than the M mode, the flash bracket photographing operation is not performed.

Figure 5:
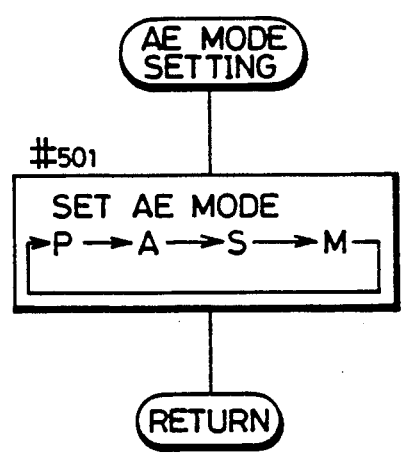
Figure 8A:
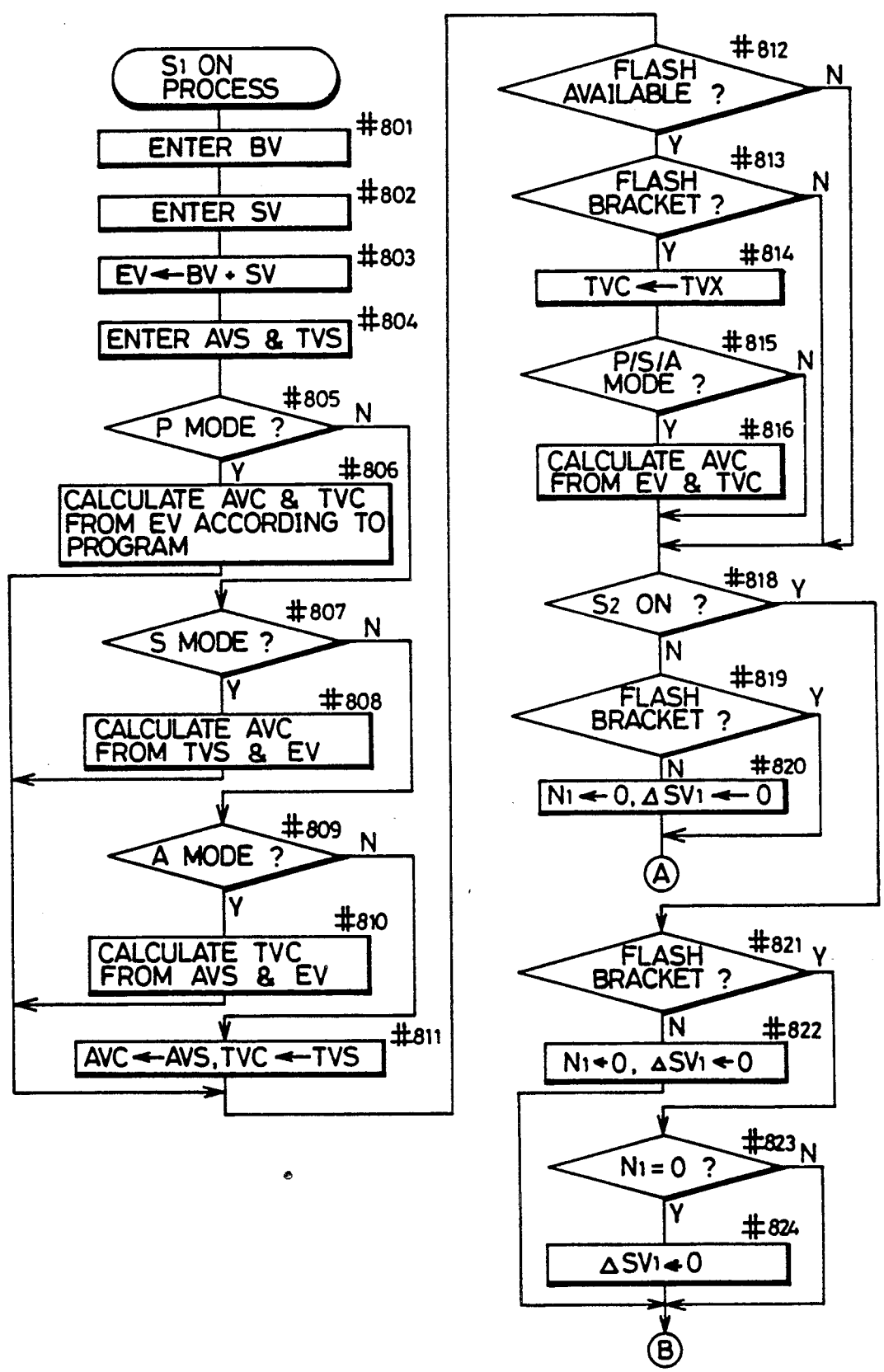
FIGS. 8A–8C are flowcharts of operations of a microcomputer of the camera system of the second embodiment.

The process of the second embodiment is now explained. Since the routines of FIGS. 3, 4 and 5 are also applicable to the present embodiment, the $S_1$-ON process of FIGS. 8A, 8B and 8C, rather than FIGS. 6A, 6B are 6C, is explained here. In FIG. 8A, steps #801-#811 are the same as steps #601-#611 of FIG. 6A. At step #812, it is judged whether or not it is flash ON mode. When it is flash ON mode, the process proceeds to step #813 and otherwise to step #818.

At step #813, it is further judged whether it is the flash bracket photographing mode. When the bracket photographing mode has been set by the bracket setting switch 11, step #814 is executed where the control shutter speed TVC is set at the maximum synchronizing speed TVX to synchronize the shutter to the flash light (TVC←TVX). Then it is judged at step #815 whether the current exposure control mode is P, S or A. If the current mode is either of P, S and A mode, the control aperture value AVC is calculated from the exposure value EV and the control shutter speed TVC (=TVX) at step #816 followed by step #818. Here, in case of either P or S mode, the control aperture value AVC is calculated again from EV and TVX, and in case of A mode, the set aperture value AVS is used as the control aperture value AVC (the control shutter speed TVC is TVX). If the judgment result is NO at step #815, it is currently M mode where the exposure is manually controlled and the process directly proceeds to step #818. When it is not flash bracket photographing mode at step #813, the process also comes to step #818.

Figure 8B:
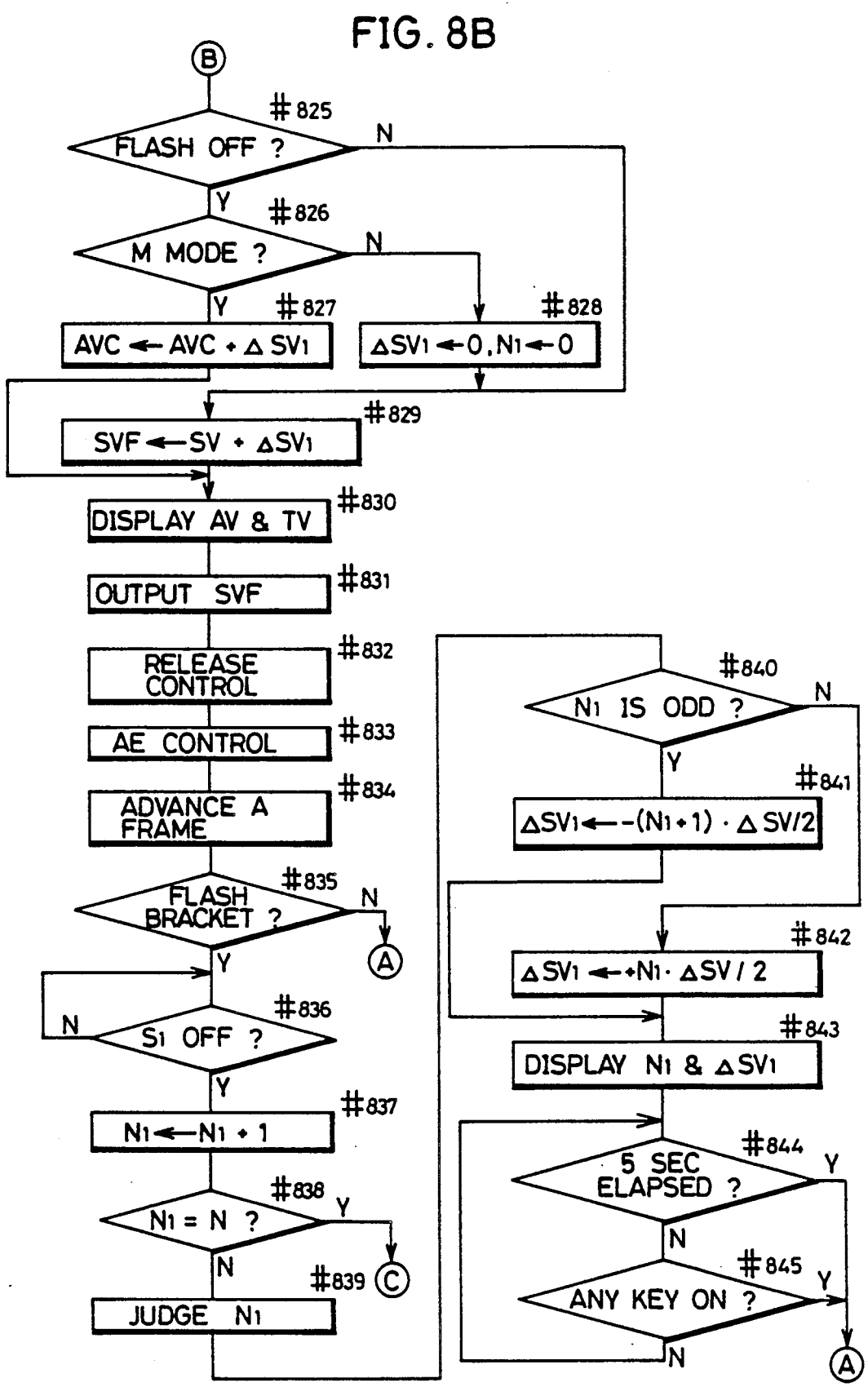
Figure 8C:
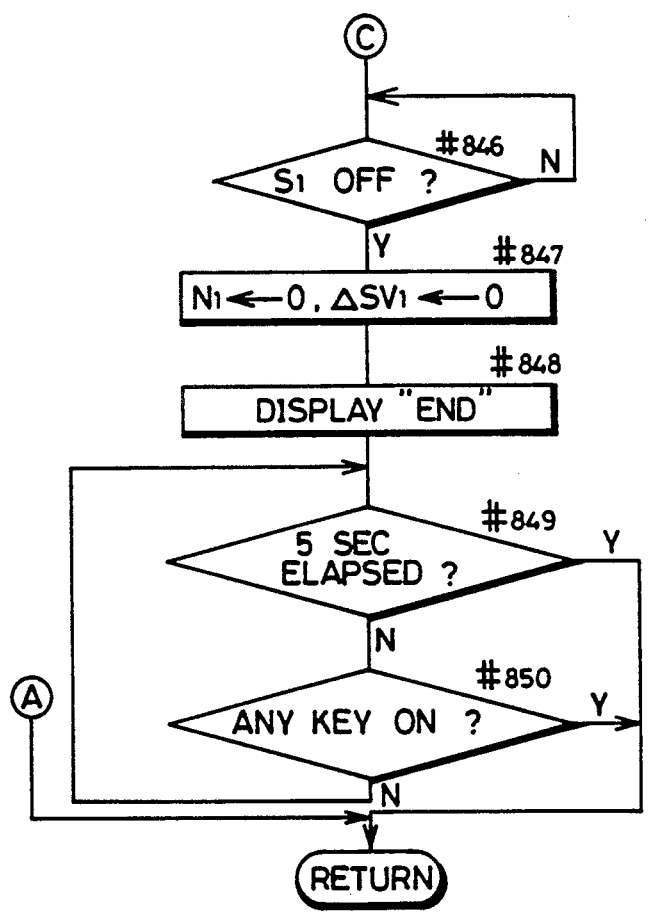

At step #818, it is judged whether the shutter release switch $S_2$ is on. When it is OFF, it is further judged whether it is flash bracket photographing mode at step #819. When it is flash bracket photographing mode at step #819, the process returns, but otherwise the number of exposed frames and the adjustment value are both initialized to zero ($N_1$←0, $\Delta SV_1$←0) at step #820. The process then returns. When the shutter release switch $S_2$ is on at step #818, it is judged at step #821 whether it is flash bracket photographing mode. If it is not flash bracket photographing mode, the number of exposed frames and the adjustment value are both initialized to zero at step #822. After the initialization, step #825 of FIG. 8B is executed. When it is flash bracket photographing mode at step #821, the number $N_1$ is judged at step #823 whether it is zero. If the number $N_1$ is not zero, step #825 follows, and otherwise ($N_1$=0) step #824 is executed to initialize the number of exposed frames and the adjustment value ($N_1$←0, $\Delta SV_1$←0) which is also followed by step #825.

At step #825, the flash mode is judged (flash ON mode or flash OFF mode). As described before, the flash ON mode is effective only when a controllable flash unit is attached and the flash switch is ON, and otherwise it is the flash OFF mode. If it is flash OFF mode at step #825, it is then judged at step #826 whether the exposure control mode is M. In case of M mode where the photographer decides the exposure, the flash bracket photographing operation is performed with a fixed flash light amount. That is, a new control aperture value AVC is calculated by adding an adjustment $\Delta SV_1$ to the previous control aperture value AVC at step #827, followed by step #830. When it is not M mode at step #826, i.e., it is P, S or A mode, the flash bracket photographing is not appropriate. Therefore the initialization is executed at step #828 ($N_1$←0, $\Delta SV_1$←0) to perform normal photographing, followed by step #829.

When it is judged flash ON mode at step #825, the flash bracket photographing is performed from step #829 et seq. since the flash light amount of the flash unit is controllable. The flash light amount SVF is calculated at step #829 by:

$$SVF = SV + \Delta SV_1.$$

Then the control values AVC and TVC are displayed at step #830 by the displaying circuit 3.

The process after steps #831 is the same as that of the first embodiment. That is, the steps #831-#850 of FIG. 8B correspond to steps #629-#648 of FIG. 6B, where the exposure control, film winding-up control and calculations for the next frame photographing in the bracket photographing are performed (steps #837-#845). When the number of exposed frames $N_1$ reaches the preset number N, the finishing process for the bracket photographing is executed at steps #846-#850 of FIG. 8C.

As described above, in the second embodiment, when the exposure control mode is M and the flash mode is flash OFF mode, the bracket photographing operation is performed where the aperture value is changed at every exposure operation (steps #825, #826 and #827). When the flash mode is flash OFF mode and the exposure control mode is P, A or S, the bracket photographing is not performed (steps #825, #826 and #828). When the flash mode is flash ON mode (where a controllable flash unit is used), the flash light amount is changed at every frame of the bracket photographing (steps #825 and #829).

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be constructed as being included therein.

What is claimed is:

1. A flash bracket photographing apparatus for a camera comprising:
   bracket photographing means for sequentially taking a plurality of photographs;
   exposure controlling means for controlling exposure by varying amount of incident light entered into the camera;
   flash light emitting means;
   light amount controlling means for controlling a light amount emitted from the flash light emitting means; and
   flash bracket means for controlling the light amount controlling means so that the light amount emitted from the flash light emitting means changes every time the bracket photographing means takes a photograph,
   while controlling said exposure controlling means constant so that the amount of ambient light entered into the camera is kept constant and the amount of flash light entered into the camera is varied.

2. A flash bracket photographing apparatus as in claim 1, where the light amount controlling means comprises:
   light receiving means for receiving light from an object while the flash light emitting means emits flash light, and
   light stopping means for stopping the emission of light of the flash light emitting means when the amount of light received by the light receiving means reaches a preset value, and the flash bracket means changes the preset value every time the bracket photographing means takes a photograph.

3. A flash bracket photographing apparatus as in claim 1 further comprising frame number setting means for setting the number of photographs taken by the bracket photographing means.

4. A flash bracket photographing apparatus as in claim 3, where the light amount controlling means comprises:

light receiving means for receiving light from an object while the flash light emitting means emits flash light, and light stopping means for stopping the emission of light of the flash light emitting means when the amount of light received by the light receiving means reaches a preset value, and the flash bracket means changes the preset value every time the bracket photographing means takes a photograph.

5. A flash bracket photographing apparatus as in claim 4, where the flash bracket means changes the preset value sequentially as:

$$p, p-\Delta x, p+\Delta x, p-2\cdot\Delta x, p+2\cdot\Delta x,$$

in which p is the most suitable value for the photographic scene, and $\Delta x$ is a unit amount of the change in the preset value.

6. A flash bracket photographing apparatus as in claim 1, where the camera comprises mode setting means for setting an exposure control mode of the camera among a program controlled mode, a aperture priority mode, a shutter speed priority mode and a manual control mode, and the flash bracket means is functionable in the program controlled mode, the aperture priority mode or the shutter speed priority mode.

7. A flash bracket photographing apparatus for a camera comprising:

bracket photographing means for sequentially taking a plurality of photographs;

flash light emitting means;

aperture value controlling means;

flash contribution setting means for setting a contribution ratio of the flash light of the flash light emitting means among the light coming to the camera; and flash bracket means for controlling the aperture value controlling means to change the aperture value every time the bracket photographing means takes a photograph, the change in the aperture value being according to the contribution ratio set by the flash contribution setting changing means, wherein the amount of the flash light emitted by the flash light emitting means is fixed while the bracket photographing means sequentially takes a plurality of photographs.

8. A flash bracket photographing apparatus as in claim 7, where the camera comprises mode setting means for setting an exposure control mode of the camera among a manual control mode and at least one automatic exposure control mode, and the flash bracket means is functionable only in the manual control mode.

9. A flash bracket photographing apparatus for a camera comprising:

bracket photographing means for sequentially taking a plurality of photographs;

flash light emitting means attachable to the camera;

exposure control means for controlling an aperture value and a shutter speed;

detecting means for generating an attachment signal when the flash light emitting means is attached to the camera, and a non-attachment signal when the flash light emitting means is not attached;

flash bracket means for controlling one of the flash light emitting means and the exposure control means every time the bracket photographing means takes a photograph; and determining means for determining, according to the signal from the detecting means, which one of the flash photographing means and said exposure control means should be controlled by said flash bracket means.

10. A flash bracket photographing apparatus as in claim 9, where the camera comprises mode setting means for setting an exposure control mode of the camera among a manual control mode and at least one automatic exposure control mode, and the supervising means controls the flash bracket means in the manual control mode so that the flash bracket means changes, every time the bracket photographing means takes a photograph, a flash light emitting amount of flash light emitting means in receiving the attachement signal, and the flash bracket means controls the exposure control means to change, every time the bracket photographing means takes a photograph, an aperture value in receiving the non-attachment signal.

11. A flash bracket photographing apparatus as in claim 9, where the detecting means generates the attachment signal only when the light unit emitting means whose flash light emitting amount can be controlled is attached to the camera, and otherwise generates the non-attachment signal.

12. A flash bracket photographing apparatus for a camera comprising:

bracket photographing means for sequentially taking a plurality of photographs;

flash light emitting means;

aperture value controlling means;

means for setting an exposure condition;

flash contribution varying means for varying a contribution ratio of the flash light of the flash light emitting means among the light coming to the film of the camera every time the bracket photographing means takes a photograph; and flash bracket means for controlling one of the flash light emitting means and the aperture value controlling means in accordance with the exposure condition set by said setting means every time the bracket photographing means takes a photograph according to the contribution ratio varied by said varying means.

13. A flash bracket photographing apparatus as in claim 12 further comprising supervising means for preventing the flash bracket means from working at a predetermined condition.

14. A flash bracket photographing apparatus as in claim 12 further comprising detecting means for detecting whether or not the flash light emitting means is controllable of the flash light emitting amount, where the condition is that the flash light emitting means is not controllable.

15. A flash bracket photographing apparatus for a camera to which an electronic flash device is attachable, comprising:
   bracket photographing means for sequentially taking a plurality of photographs;
   exposure control means for controlling an aperture value and a shutter speed;
   detecting means for detecting whether or not the flash light amount which is to be emitted from said electronic flash device is controllable;
   flash bracket means for controlling one of the electronic flash device and the exposure control means every time the bracket photographing means takes a photograph; and
   determining means for determining, according to the detection of the detecting means, which one of the electronic flash device and said exposure control means should be controlled by said flash bracket means.

16. A flash bracket photographing apparatus as in claim 15, wherein said detecting means detects whether or not the electronic device attached to the camera is a type that amount of flash light emitted therefrom is controllable.

17. A flash bracket photographing apparatus as in claim 15, wherein said detecting means detects whether or not the electronic device attached to the camera is enabled to emit light.

18. A flash bracket photographing apparatus for a camera comprising:
   bracket photographing means for sequentially taking a plurality of photographs;
   flash light emitting means;
   flash light emission amount varying means for controlling the emission duration of the flash light emitting means based on the amount of light emitted by the flash light emitting means and reflected by a subject; and
   flash bracket controlling means for changing the emission duration of the flash light emitting means every time the bracket photographing means takes a photograph, while maintaining an aperture value and shutter speed of the camera at fixed values.

19. A flash bracket photographing apparatus for a camera comprising:
   mode setting means for selectively setting a mode between a mode for automatically controlling at least one of a shutter speed and an aperture value and a mode for manually setting both of the shutter speed and aperture value;
   bracket photographing means for sequentially taking a plurality of photographs;
   flash light emitting means;
   flash light emission amount varying means for controlling the emission amount of the flash light emitting means; and
   flash bracket controlling means for changing the emission duration of the flash light emission amount varying means every time the bracket photographing means takes a photograph, and controlling the shutter speed and aperture value so as to take predetermined values, respectively, when the mode for manually setting both of the shutter speed and aperture value is selected by the mode setting means.

20. A flash bracket photographing apparatus according to claim 19, where the flash light emission amount varying means controls the emission duration of the flash light emitting means based on the amount of light emitted by the flash light emitting means and reflected by a subject.

* * * * *

UNITED STATES PATENT AND TRADEMARK OFFICE
CERTIFICATE OF CORRECTION

PATENT NO. : 5,130,737
DATED : July 14, 1992
INVENTOR(S) : Yoshihiko Azuma, et al.

It is certified that error appears in the above-identified patent and that said Letters Patent is hereby corrected as shown below:

In Col. 5, line 47, the large space following "+$\Delta$SV" should not be present.

In Col. 6, line 44, "($N_1 \rightarrow 0$, $\Delta SV_1 \rightarrow 0$)" should be --($N_1 \leftarrow 0$, $\Delta SV_1 \leftarrow 0$)--.

In Col. 9, line 23, the large space following "+$\Delta$SV" should not be present.

In Col. 13, line 27 (Claim 5, line 4), at the end of the equation, following "2·$\Delta$X," insert --···,--.

Signed and Sealed this

Twenty-fourth Day of August, 1993

*Attest:*

BRUCE LEHMAN

*Attesting Officer*     *Commissioner of Patents and Trademarks*